June 9, 1936.　　　K. H. HUBBARD　　　2,043,583

THERMOMETER

Filed Sept. 13, 1933

INVENTOR
Karl H. Hubbard
BY D. Clyde Jones
ATTORNEY

Patented June 9, 1936

2,043,583

UNITED STATES PATENT OFFICE 2,043,583

THERMOMETER

Karl H. Hubbard, Rochester, N. Y., assignor to Taylor Instrument Companies, Rochester, N. Y., a corporation of New York Application September 13, 1933, Serial No. 689,216

8 Claims. (Cl. 73—52)

This invention relates to thermometers.

While various transparent liquids including organic liquids have been widely used as the expansible medium in glass thermometers, it has been necessary to introduce dyes or coloring agents into these liquids to render them easily visible. It is difficult to get dyes which do not fade, even at the lower temperatures, but at temperatures above 400° F. these dyes are so highly unstable that such colored liquids are not recommended for use in thermometers which are subjected to high temperatures.

In accordance with the present invention, it is proposed to obviate the need for dyes in such liquids and thereby extend the useful field of a glass thermometer filled with a transparent liquid by utilizing a colored strip incorporated in the glass tube, to give the liquid therein the appearance of being colored so that it is unnecessary actually to color the liquid by dyes or other coloring agents.

The main feature of the invention resides in the construction of a glass thermometer, in which a transparent liquid employed as a filling medium transmits light from a colored strip to assist in reading the height of such liquid column in the thermometer.

A further feature of the invention resides in transmitting colored light through the transparent filling medium in the bore of a glass thermometer and in reflecting from the surface of the unfilled bore, light of a color contrasting with that of the first mentioned light to facilitate the reading of the thermometer.

An additional feature of the invention includes a thermometer tube having a bore with a flattened surface inclined to the axis of symmetry of the reading face of the tube at an angle exceeding the critical angle of the glass to the vapor in the bore.

Figure 1:
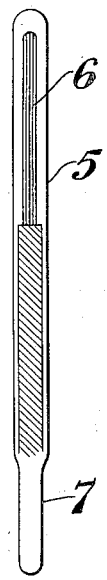
Figure 2:
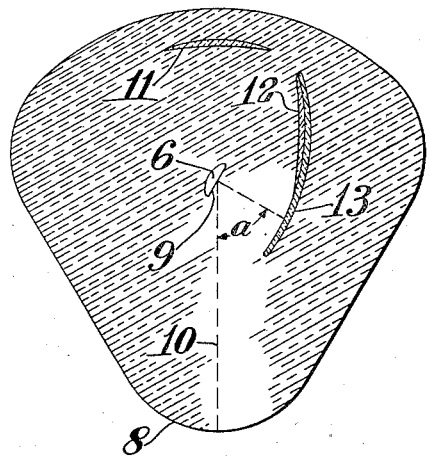
Figure 3:
Figure 4:
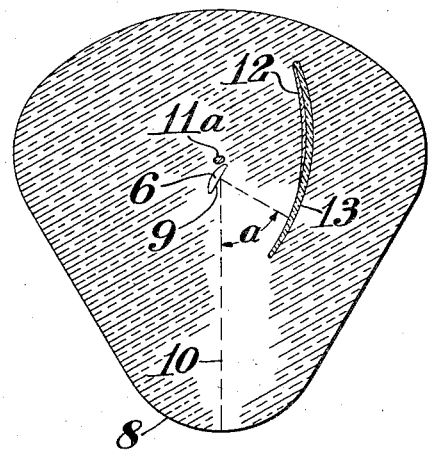

These and other features of the invention will appear from the detailed description and claims when taken with the drawing in which Fig. 1 is a front elevation of a thermometer made in accordance with the invention; Fig. 2 is an enlarged cross sectional view of the thermometer of Fig. 1; Fig. 3 is a front elevation of a slightly modified form of the invention; and Fig. 4 is an enlarged cross sectional view of the thermometer of Fig. 3.

In Fig. 1, 5 designates a thermometer tube having a bore 6 therein, which communicates with a bulb 7 attached to the lower end of the tube. This bulb may be filled with any transparent filling liquid but it is preferred to employ high boiling organic liquids such as benzyl ether, tridecane, tetradecane and the like. As herein more clearly shown in Fig. 2, the thermometer tube 5 has a lens front portion 8, although the invention is not limited to this type of tube but is equally applicable to thermometer tubes having various contours. The bore 6 has a flattened surface 9 which is inclined to the axis 10 so that the angle "a" between this axis and the normal to the surface 9 is greater than the critical angle of the glass to the medium in the bore above the liquid column. Under the conditions illustrated, angle "a" should have a value of not less than fifty degrees. For convenience in description, axis 10 is herein referred to as the axis of symmetry of the tube. Directly behind the bore 6, there is incorporated within the material of the glass tube a strip 11 which may be black, white, or any color. This strip is substantially coextensive with the length of the bore and has a width that appears to be slightly greater than the width of the bore when viewed through the reading face or lens front 8 of the tube.

It will be understood that, due to the mentioned inclination of the bore surface 9 to the axis 10, major portion of the light passing through the reading face 8 or lens front of the tube is totally reflected from the surface 9 of the empty portion of the bore 6 so that the upper portion of the strip 11 is for the most part invisible when viewed from the front of the tube. However, in that portion of the bore where the expansible liquid has risen, the light passes almost directly therethrough to the colored strip 11 so that the liquid in the bore 6 appears to have the color of this strip.

If desired, the empty portion of the bore 6 above the column of the expansive liquid may be made to have the appearance of being colored in contrast to the liquid column. For this purpose a strip of material 12, colored white, black or any color in contrast to that of strip 11, is arranged parallel to the bore and has its surface oriented with respect to the flat surface 9 of the bore, so that rays reflected from the strip 12 to the surface 9 of the unfilled bore, pass through the reading face 8 of the tube. However, the rays of light from the strip 12 will pass almost straight through the transparent liquid in the filled portion of the bore. These rays will therefore not be visible from the reading face of the tube. The strip 12, with the exception of its surface facing the bore, is covered with a layer 13 of inconspicuous opaque material so that the strip 12 is not directly visible through the reading face of the tube.

The thermometer shown in Figs. 3 and 4 differs from that illustrated in Figs. 1 and 2, in that the colored strip at the rear of the bore, indicated at 11a in Fig. 4, is positioned closely adjacent to the bore 6, but it may even form a portion of the rear wall of the bore. The strip 11a should have a width such that it appears to be coextensive with the width of the bore when viewed from the front of the tube.

It will be understood that in this description the term "color" includes black and white.

I claim:

1. A transparent thermometer tube designed to be filled with a transparent filling liquid, said tube having a reading face and a bore provided with a flattened surface inclined to the axis of symmetry of the contour of the tube, the angle between said axis and the normal to said surface being greater than the critical angle of the tube material to the unfilled bore, and a visible strip adjacent to and positioned behind the bore in the body of the tube.

2. A glass thermometer tube designed to be filled with a transparent filling liquid, said tube having a reading face and a bore provided with a flattened surface inclined to the axis of symmetry of the contour of the tube, the angle between said axis and the normal to said surface being greater than the critical angle of the glass to the unfilled bore, and a colored strip adjacent to and positioned behind the bore within the material of the glass.

3. A thermometer including a transparent glass thermometer tube having a reading face and a bore provided with a flattened surface inclined to the axis of symmetry of the reading face of the tube, the angle between said axis and the normal to said surface being greater than the critical angle of the glass to the unfilled bore, a bulb containing a transparent liquid communicating with said bore, and a colored visible strip substantially optically coextensive with and positioned behind the bore in the tube.

4. A glass thermometer tube designed to be filled with a transparent filling liquid, said tube having a reading face and a bore provided with a flattened surface inclined to the axis of symmetry of the reading face of the tube, the angle between said axis and the normal to said surface being greater than the critical angle of the glass to the unfilled bore, a visible strip adjacent to and positioned behind the bore with respect to the reading face of the tube, and a second strip of different appearance from the first strip and positioned at one side of the axis of symmetry and oriented with respect to the flattened surface of the bore so that rays from said second strip are reflected from the surface of the unfilled bore through the reading face of the tube.

5. A glass tube designed to be filled with a transparent filling liquid, said tube having a reading face and a bore provided with a flattened surface inclined to the axis of symmetry of the reading face of the tube, the angle between said axis and the normal to said surface being greater than the critical angle of the glass to the unfilled bore, a visible strip adjacent to and positioned behind the bore with respect to the reading face of the tube, a second strip of different appearance from the first strip and positioned at one side of the axis of symmetry and oriented with respect to the flattened surface of the bore so that rays from said second strip are reflected from the surface of the unfilled bore through the reading face of the tube, and means for concealing the surface of said second strip from direct observation through the reading face of the tube.

6. A transparent thermometer tube designed to be filled with a transparent filling liquid, said tube having a reading face, a bore provided with a flattened surface inclined to the axis of symmetry of the reading face of the tube, the angle between said axis and the normal to said surface being greater than the critical angle of the glass to the unfilled bore, and a colored strip positioned at one side of the axis of symmetry and oriented with respect to the flattened surface of the bore so that rays from said strip are reflected from the surface of the unfilled bore through the reading face of the tube.

7. A thermometer including a transparent glass thermometer tube having a reading face and a bore provided with a flattened surface inclined to the axis of symmetry of the reading face of the tube, the angle between said axis and the normal to said surface being greater than the critical angle of the glass to the unfilled bore, a bulb containing a transparent liquid communicating with said bore, a colored strip substantially coextensive in length with and positioned behind the bore in the tube, and a second strip of different appearance from the first strip and positioned at one side of the axis of symmetry, said second strip being oriented with respect to the flattened surface of the bore so that rays from said second strip are reflected through the reading face of the tube from the surface of the unfilled portion of the bore, whereas rays from said second strip incident on the filled portion of the bore are transmitted therethrough.

8. A glass thermometer tube designed to be filled with a transparent filling liquid, said tube having a reading face and a bore provided with a flattened surface inclined to the axis of symmetry of the reading face of the tube, the angle between said axis and the normal to said surface being greater than the critical angle of the glass to the vapor in the bore, a visible strip adjacent to and positioned behind the bore in the body of the glass, a second strip of contrasting appearance to the first and parallel to the bore, the surface of said second strip being generally parallel to said flat surface, said second strip being oriented with respect to the flattened surface of the bore so that rays from said second strip are reflected through the reading face of the tube from the surface of the unfilled portion of the bore.

KARL H. HUBBARD.